United States Patent [19]

Leistenschneider et al.

[11] Patent Number: 4,821,018
[45] Date of Patent: Apr. 11, 1989

[54] DIRECTION INDICATOR AND HAZARD WARNING DEVICE FOR MOTOR VEHICLES

[75] Inventors: Raimund Leistenschneider, Sindelfingen; Klaus Neuffer, Böblingen; Egon Frey, Starzach-Felidorf, all of Fed. Rep. of Germany

[73] Assignee: Daimler-Benz Aktiengesellschaft, Stuttgart, Fed. Rep. of Germany

[21] Appl. No.: 92,883

[22] Filed: Sep. 4, 1987

[30] Foreign Application Priority Data

Sep. 6, 1986 [DE] Fed. Rep. of Germany ....... 3630448

[51] Int. Cl.4 .............................................. B60Q 1/46
[52] U.S. Cl. .................................... 340/471; 340/475
[58] Field of Search ................... 340/67, 72, 73, 81 R, 340/66, 81 F, 74; 307/10 LS; 315/77

[56] References Cited

U.S. PATENT DOCUMENTS

| | | | |
|---|---|---|---|
| 3,555,507 | 1/1971 | Burson | 340/62 |
| 4,037,195 | 7/1977 | Wojslawowicz | 340/66 |
| 4,302,748 | 11/1981 | Gant | 340/81 F X |
| 4,380,753 | 4/1983 | Gant | 340/66 |

FOREIGN PATENT DOCUMENTS

| | | |
|---|---|---|
| 1780198 | 8/1968 | Fed. Rep. of Germany . |
| 3147682 | 12/1981 | Fed. Rep. of Germany . |
| 3214095 | 10/1983 | Fed. Rep. of Germany . |
| 2028000 | 2/1980 | United Kingdom . |

Primary Examiner—Joseph A. Orsino
Assistant Examiner—Jeffery A. Hofsass
Attorney, Agent, or Firm—Barnes & Thornburg

[57] ABSTRACT

In a direction indicator and hazard warning device for motor vehicles, a time sequence control is provided, which, during hazard warning operation with a closed driving/ignition switch, allows direction indicator signals to be superimposed and, when the direction indicator signals are switched on, the hazard warning signal to be superimposed. The signal first selected is automatically generated once again after the added signal has been switched off. If, however, the driving/ignition switch is closed with the hazard warning switch and the direction indicator switch closed, the device causes the hazard warning signal to continue to be generated.

6 Claims, 1 Drawing Sheet

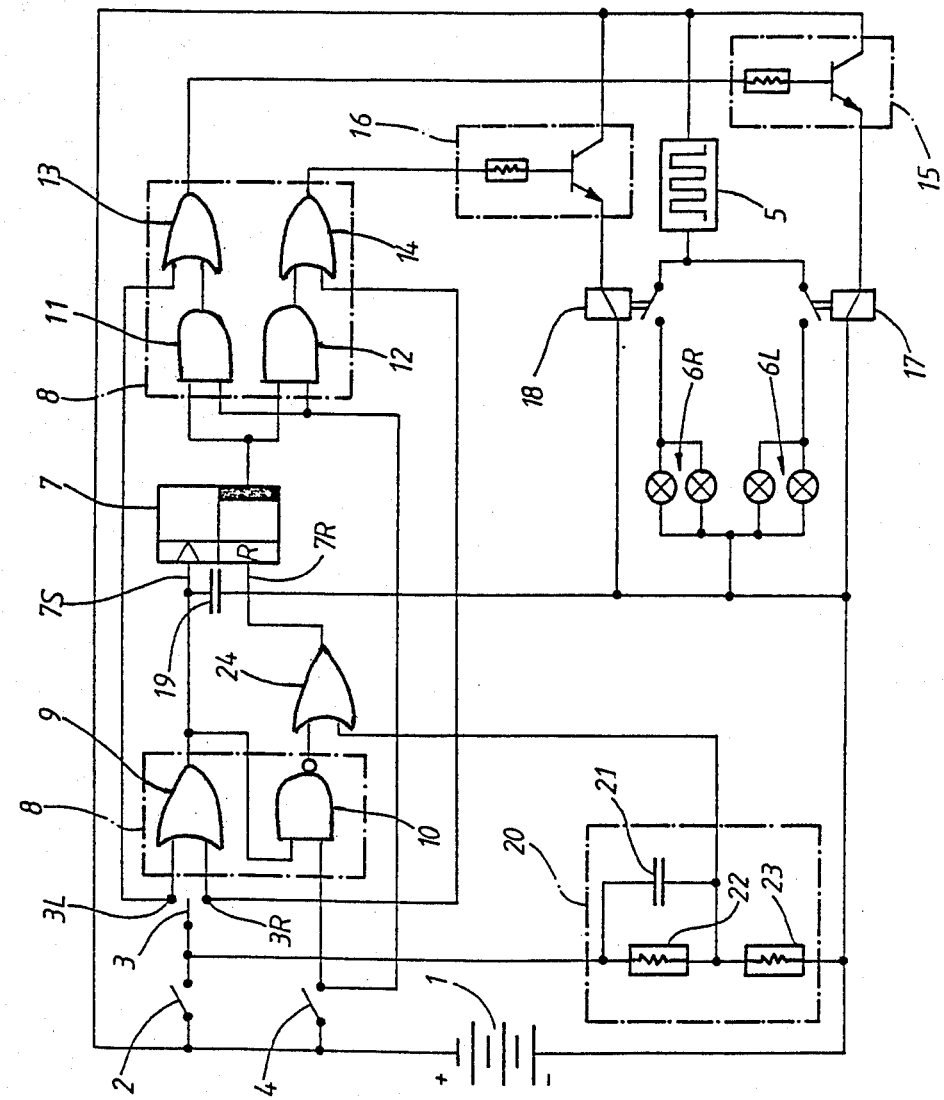

DIRECTION INDICATOR AND HAZARD WARNING DEVICE FOR MOTOR VEHICLES

BACKGROUND AND SUMMARY OF THE INVENTION

The present invention relates to a direction indicator and hazard warning device for motor vehicles.

A device of this type is shown in German Published Unexamined Patent Application No. 3,147,682. This known equipment permits the drivers of vehicles, which have to be driven with the hazard warning signal switched on during a towing procedure or after a breakdown, to superimpose on the hazard warning signal present on all sides, direction indicator signals, for turning off or changing lanes, by switching on the direction indicator switch. This is providing that the driving switch or the ignition switch of the vehicle concerned is switched on. This switching capability is achieved by switching off or interrupting, by mechanical or electrical means, the electricity supply from a central flashing pulse generator to the right or left flashing lamp group not selected by the direction indicator switch when the direction indicator switch is switched on. If the direction indicator switch is switched off again while the hazard warning switch remains closed, all the flashing lamps are connected again to the pulse generator.

Because of the electricity supply interruption used, however, the known equipment does not permit the hazard warning function of the equipment to be switched on by subsequent operation of the hazard warning switch when the driving switch and the direction indicator switch are switched on. Because of this, the hazard warning function can be suppressed in certain situations without the knowledge and against the wish of the vehicle driver, even though the driver has correctly switched on the hazard warning switch. This will occur, for example, where in the event of a breakdown, direction indicator signals are first switched on when driving to the side of the road and the hazard warning switch is subsequently switched on to indicate a breakdown while the driving switch or ignition switch is still switched on and because of the small steering wheel deflection, no automatic reset of the direction indicator switch occurs. Similarly, in the known device, the hazard warning signal is suppressed as soon as the driving switch is closed if the direction indicator switch and the hazard warning switch are both closed (because the direction indicator signal then has absolute priority) without any deliberate operation of the direction indicator switch.

Also known is a direction indicator/hazard warning switch arrangement from German Published Unexamined Patent Application No. 1,780,198, which combines both switches in one structural unit and connects them together such that when the direction indicator blinking lamp is switched on and the hazard warning lamp is added, the direction indicator switch returns automatically into the off position, and in the case of the hazard warning lamp being switched on and the direction indicator blinking lamp being added, the hazard warning switch returns automatically into the off position. With this equipment also, therefore, it is possible to switch on the hazard warning signal subsequently (with the direction indicator signal already switched on) by simply operating the hazard warning switch. Because of the mechanical switch reset, however, there is no automatic resumption of a function, such as the hazard warning, for example, after a signal has been given to indicate that a vehicle in trouble is changing direction.

An object of the present invention is to provide a direction indicator and hazard warning device in which a direction indicator signal can be superimposed on the hazard warning signal or a hazard warning signal can be superimposed on the direction indicator signal, for the period while the particular added signal is switched on, by the sole action of arbitrarily switching on the direction indicator switch or the hazard warning switch, respectively.

This and other objects are achieved by providing a direction indicator and hazard warning device for motor vehicles with driving switch means for indicating operation of the motor vehicle. The device includes lamp group means for displaying a direction signal and a hazard warning signal. The device also includes direction indicator switch means mechanically actuable for causing the lamp group means to display a direction signal, while hazard warning switch means are mechanically actuable independently from the direction indicator switch means for causing the lamp group means to display the hazard warning signal. Memory circuit means store and output logic signals, while logic circuit means are connected to the direction indicator switch means and the hazard warning signal means for supplying logic signals in response to open and closed positions of the direction indicator switch means and the hazard warning switch means. The logic circuit means includes connecting elements between each of the direction indicator switch means and the hazard warning switch means and inputs of the memory circuit means. The logic circuit means also includes logic components connected to an output of the memory circuit means. Pulse generator means are connected to the lamp group means for generating the direction signal and the hazard signal in response to actuation of the direction indicator switch means and the hazard warning switch means, respectively.

The connecting elements and the memory circuit means form time sequence control circuit means for controlling the switching element via the logic components and: if the driving switch means is closed, connecting the pulse generator means to the lamp group means, to correspondingly indicate the hazard warning signal or the direction signal in response to whichever of the direction indicator switch means or hazard warning switch means was last actuated, irrespective of the switch position of whichever of the switch means was not last actuated; and if both the direction indicator switch means and the hazard warning switch means have been actuated, and subsequently one of the switch means has been deactuated, connecting the lamp group means to the pulse generator means to indicate either direction signals or hazard warning signals corresponding to whichever switch means remains actuated. The device also includes suppression circuit means connected to the driving switch means for suppressing a control of the memory circuit means resulting from the driving switch means being closed when both the direction indicator switch means and the hazard warning switch means are closed.

This device has the advantage that no absolute priority is provided for a particular flashing signal so that the user of a vehicle can be sure that the signal function which he last switched on manually is actually generated and executed. Provision is made in an advantageous and safe manner, however, to give the hazard warning signal priority whenever the driving switch or ignition switch of the vehicle is opened and subsequently closed again. Using the device according to the invention, the hazard warning signal can only be switched off by switching off the hazard warning switch and can only be suppressed by adding the direction indicator switch with the driving switch closed.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic diagram of a direction indicator and hazard warning device constructed in accordance with a preferred embodiment of the present invention.

DETAILED DESCRIPTION OF THE DRAWINGS

A driving switch 2, having in series with it a direction indicator switch 3 with two output terminals 3R and 3L, a hazard warning switch 4 in parallel with the two switches 2 and 3 and a flashing pulse generator 5 are all connected to the positive pole of a voltage source 1. A right-hand flashing lamp group 6R and a left-hand flashing lamp group 6L are connected in series with the pulse generator 5. In order to make the diagram more easily comprehensible, control lamps for the flashing lamp groups are not shown; however, they are used in a known manner.

A logic circuit 8 is shown divided into two blocks. The block arranged on the left in the circuit diagram has an OR element 9 and a NAND element 10. Leads from the two output terminals 3R, 3L of the direction indicator switch 3 are connected to the two inputs of the OR element 9. A branch from the output of the OR element 9 is fed to one input of the NAND element 10, while a connection from the output terminal of the hazard warning switch 4 is supplied to the second input of the NAND element 10. Another branch from the output of the OR element 9 leads to a dynamic SET input 7S of a flip-flop 7 used as a memory circuit. The output of the NAND element 10 is connected to a RESET input 7R of the flip-flop 7 via an OR element 24, which is explained later.

The single output of the flip-flop 7 is fed by two branches into the second block of the logic circuit 8 (shown to the right in the drawing) which is formed from the components connected after the memory circuit 7. Each branch is connected to one input of one of two AND elements 11 and 12. A branch of a connection from the output terminal of the hazard warning switch 4 is connected to each of the other inputs of the AND elements 11, 12.

The further logic circuit 8 connected after the memory circuit, includes as components, two OR elements 13 and 14. The output of the AND element 11 leads to an input of the OR element 13, whose second input is connected to the terminal 3L of the direction indicator switch 3. As a symmetrical arrangement to this, the output of the AND element 12 is connected to the first input of the OR element 14 and the terminal 3R of the direction indicator switch 3 is connected to the second input of the OR element 14.

The output of the OR element 13 of the logic circuit 8 is connected to the base of a transistor amplifier 15 via a resistor and the output of the OR element 14 is connected in a similar manner to the base of another transistor amplifier 16. The collectors of the two amplifiers 15 and 16 are connected, in parallel with the pulse generator 5, to the positive pole of the voltage source 1.

The emitter of the amplifier 15 is connected to the excitation coil of a relay 17 whose circuit-closing switch is looped into the connection between the pulse generator 5 and the left-hand flashing lamp group 6L. As a symmetrical arrangement to this, the emitter of the amplifier 16 is connected to the excitation coil of a relay 18 whose circuit-closing switch is looped into the connection between the pulse generator 5 and the right-hand flashing lamp group 6R.

A time element in the form of a capacitor 19 delays a SET signal at the input 7S of the flip-flop 7 relative to the time when switching occurs through the OR element 9. A branch line is led out from the connection between the driving switch 2 and the direction indicator switch 3 to a pulse generator 20 which is made up of two resistors 22 and 23, connected in series, and a capacitor 21 connected in parallel with the first resistor 22. A pulse output from the pulse generator 20 is led out before the second resistor 23; this pulse output is logically combined, at the OR element 24, with the output of the NAND element 10 of the logic circuit 8 and is connected to the RESET input 7R of the flip-flop 7 via the output of the OR element 24.

In order to generate direction indicator signals during normal operation of the vehicle, the following alternatives can be selected at the direction indicator switch 3, which is supplied with positive potential (∧ level H) from the voltage source 1 via the closed driving/ignition switch 2. For "turn right signal", the terminal 3R/OR element 14/amplifier 16/relay 18 electricity Path is used, so that the flashing lamp group 6R is connected through the circuit-closing switch of the relay 18 to the pulse generator 5. For a "turn left signal", the terminal 3L/OR element 13/amplifier 15/relay 17 electricity path is used, so that the flashing lamp group 6L is connected through the circuit-closing switch of the relay 17 to the pulse generator 5.

Before the hazard warning function is described, the mode of operation of the flip-flop 7 should first be explained. The level HIGH (H) is applied to the RESET input 7R of the flip-flop 7 by the NAND element 10 of the logic circuit 8 via the OR element 24 as long as both inputs of the NAND element 10 do not also have the level H. Both inputs will have the level H precisely when the driving switch 2, the direction indicator switch 3 and the hazard warning switch 4 are all closed.

If the level H is present at the RESET input 7R, the flip-flop 7 is continually in the reset position and also exhibits level H at its output.

A change in the condition of the flip-flop 7 and of its output level from H to LOW (L) only occurs when the level L is present at the RESET input and, at the same time, a level step from L to H takes place at the dynamic SET input 7S of the flip-flop 7. A change in level at the RESET input 7R of the flip-flop 7 from H to L causes no change in state in the flip-flop 7, whatever the level of the SET input 7S.

The hazard warning switch 4 is closed in order to switch on the hazard warning signal. A level change from L to H then takes place at one input each of the AND elements 11, 12. The other inputs in each of the AND elements 11, 12 are already receiving level H from the output of the flip-flop because: (1) if the direction indicator switch 3 is open, only one input of the NAND element 10, and therefore also its output and the RESET input 7R of the flip-flop 7, have the level H; or (2) if the driving and direction indicator switches are closed, both inputs of the NAND element 10 have the level H and, therefore, its output and the RESET input 7R of the flip-flop 7 have the level L, so that no change in level from L to H takes place at the dynamic SET input of the flip-flop 7.

It follows that both AND elements 11, 12 switch through and, via the OR elements 13, 14, both amplifiers 15, 16 are simultaneously actuated. All the flashing lamps 6R, 6L are connected via the switches of the relays 17, 18 to the pulse generator 5 and generate the hazard warning signal on all sides, whatever the switch position of the switches 2 and 3. This satisfies the registration regulations which bindingly specify that the hazard warning equipment should switch on independently of the ignition switch.

Furthermore, adding the hazard warning signal to the direction indicator signal is possible because the hazard warning signal control is only associated with the direction indicator signal control at the two OR elements 13 and 14. With the addition of the hazard warning signal to the direction indicator signal, only one of the two OR elements 13, 14 is additionally switched through, both inputs at the other OR element having the level H for the period when both flashing signals are simultaneously switched on. After the hazard warning signal has been switched off, therefore, the direction indicator signals are again generated.

In the reverse case, addition of the direction indicator signals to the hazard warning signal produces the following procedure. Starting from the normal hazard warning function with the direction indicator switch 3 open and the driving switch 2 and the hazard warning switch 4 closed, as already described, the following events occur in parallel with the change of level at the associated input of one of the OR elements 13 or 14 from L to H when the direction indicator switch 3 is switched on via the terminal 3R or 3L. Via the OR element 9, a change of level occurs at the second input of the NAND element 10 from L to H and thereby blocks the NAND element 10. This brings the level at the RESET input 7R of flip-flop 7 to L. Also, via the OR element 9, a change of level occurs at the dynamic SET input 7S of the flip-flop 8 from L to H which, however, is slightly delayed, for the time necessary to charge the capacitor 19, relative to the change in level at the RESET input 7R (in order to make the switching more certain).

The flip-flop 7 switches over and the level at its output changes from H to L. In consequence, both AND elements 11 and 12 are blocked so that an H level is still present only at the output of the OR element 13 or 14 directly actuated by the direction indicator switch 3. The amplifier 15 or 16 connected to the actuated OR element remains in the switched through position while the other switches off, and therefore separates the flashing lamp group 6L or 6R not selected from the pulse generator 5. A direction indicator signal corresponding to the switch position of the direction indicator switch 3 is generated.

As soon as either the direction indicator switch 3 or the driving switch 2 is opened, however, the level changes from H to L at the input to the NAND element 10 after it and at the SET input 7S of the flip-flop 7. From the output of the NAND element 10, a level H is again applied to the RESET input of the flip-flop 7 which is again brought into its reset position with the output level H.

Since the hazard warning switch 4 remains closed, the condition for switching the two AND elements 11, 12 is satisfied once again and the hazard warning signal is again generated in the manner already described.

Although a change from the direction indicator signal to the hazard warning signal takes place (with the direction indicator switch 3 and the hazard warning switch 4 still closed) by opening the driving switch 2, as above, the direction indicator signal cannot be superimposed in the opposite direction on the still generated hazard warning signal by reclosing the driving switch 2. This is because when the driving switch 2 is switched on, a pulse appears in the pulse generator 20 before the resistor 23 and this arrives at the RESET input 7R of the flip-flop 7 via the OR element 24. By appropriately dimensioning the pulse generator 20, the switching over of the flip-flop 7 because of the change in level from L to H at the SET input 7S, slightly delayed at the capacitor 19, is prevented by the pulse level simultaneously present at the RESET input 7R. When the peak value of the pulse has decayed, the flip-flop 7 can again be switched by a renewed positive switching operation, by switching off the direction indicator switch 3 and switching it on again, for example, because the residual voltage present at the RESET input 7R from the resistor 23 does not reach a level sufficient to block the flip-flop 7.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Direction indicator and hazard warning device for motor vehicles, comprising:

driving switch means for enabling operation of said motor vehicle;

lamp group means for displaying a direction signal and a hazard warning signal;

direction indicator switch means mechanically actuable for causing said lamp group means to display said direction signal;

hazard warning switch means mechanically actuable independently from said direction indicator switch means for causing said lamp group means to display said hazard warning signal;

memory circuit means for storing and outputting logic signals;

logic circuit means connected to said direction indicator switch means and said hazard warning switch means for supplying said logic signals in response to open and closed positions of said direction indicator switch means and said hazard warning switch means, including connecting elements between each of said direction indicator switch means and said hazard warning switch means and inputs of said memory circuit means, and logic components connected to an output of said memory circuit means;

pulse generator means connectable to said lamp group means for generating said direction signal and said hazard warning signal in response to actuation of said direction indicator switch means and said hazard warning switch means, respectively;

switching elements for connecting said lamp group means to said pulse generator means;

said connecting elements and said memory circuit means forming time sequence control means for controlling said switching elements via said logic components and;

if said driving switch means is closed, connecting said pulse generator means to said lamp group means to correspondingly indicate hazard warning signals or direction signals in response to whichever of said direction indicator switch means or hazard warning switch means was last actuated, irrespective of a switch position of whichever of said direction indicator switch means or hazard warning switch means was not last actuated; and if both said direction indicator switch means and said hazard warning switch means have been actuated, and subsequently one of said direction indicator switch means and said hazard warning switch means has been deactuated, connecting said lamp group means to said pulse generator means to indicate either direction signals or hazard warning signals to whichever of said direction indicator switch means or said hazard warning switch means remains actuated; and suppression circuit means connected to said driving switch means for suppressing a control of said memory circuit means resulting from aid driving switch means being closed when both said direction indicator switch means and said hazard warning switch means are closed.

2. Device according to claim 1, wherein the memory circuit is a bistable toggle switch flip-flop with a SET input and a RESET input, said flip-flop emitting a high level at its single signal output terminal in a reset condition, said flip-flop being switchable over from said reset condition to generate a low output level only when a low input level is present at the reset input and a positive switching signal is present at the SET input due to a level change from low level to high level.

3. Device according to claim 2, wherein one of said connecting elements is a NAND element having at least one input and is looped into a connection between said hazard warning switch and said RESET input of said flip-flop; another said connecting element is a first OR element with two inputs; said direction indication switch means has two outputs connected to said two inputs of said OR element; and an output signal from said first OR element is fed to both said input of said NAND element and to said SET input of said flip-flop.

4. Device according to claim 2, further comprising a second OR element, and wherein said suppression circuit means includes circuit elements connected to said driving switch means and forming second pulse generator means with a blocking pulse output connected to said RESET input of the flip-flop via said second OR element, said pulse generator means always emitting a blocking Pulse to said RESET input at a time when said driving switch means is actuated.

5. Device according to claim 4, wherein said circuit elements of said pulse generator means are first and second series-connected resistors and a capacitor connected in parallel with said first resistor.

6. Device according to claim 3, further comprising time delay means connected at a connection between said first OR element and said input of said flip-flop for delaying a signal to said SET input.

* * * * *